(12) United States Patent
VerBrugge

(10) Patent No.: US 10,228,008 B2
(45) Date of Patent: Mar. 12, 2019

(54) SHACKLE PIN SPLIT NUT ASSEMBLY

(71) Applicant: The Crosby Group LLC, Tulsa, OK (US)

(72) Inventor: Peter VerBrugge, Tulsa, OK (US)

(73) Assignee: The Crosby Group LLC, Tulsa, OK (US)

( * ) Notice: Subject to any disclaimer, the term of this patent is extended or adjusted under 35 U.S.C. 154(b) by 336 days.

(21) Appl. No.: 15/227,645

(22) Filed: Aug. 3, 2016

(65) Prior Publication Data

US 2017/0089382 A1 Mar. 30, 2017

Related U.S. Application Data

(60) Provisional application No. 62/234,437, filed on Sep. 29, 2015.

(51) Int. Cl.
F16B 21/18 (2006.01)
F16G 15/06 (2006.01)

(52) U.S. Cl.
CPC ............ F16B 21/186 (2013.01); F16G 15/06 (2013.01)

(58) Field of Classification Search
CPC ...... F16G 15/06; F16B 21/186; F16B 43/006; F16B 37/0885; F16B 21/18; Y10T 24/1471; Y10T 24/3956; Y10T 403/32893; Y10T 403/599
See application file for complete search history.

(56) References Cited

U.S. PATENT DOCUMENTS

| | | | | |
|---|---|---|---|---|
| 520,110 A * | 5/1894 | Hull | ........................ | F16G 15/06 278/96 |
| 4,102,124 A * | 7/1978 | Swager | .................... | F16G 15/06 403/154 |
| 4,221,252 A | 9/1980 | Bruce | | |
| 5,020,676 A * | 6/1991 | McFarland | ............ | B65D 59/00 211/59.4 |
| 5,597,260 A | 1/1997 | Peterson | | |
| 6,023,927 A | 2/2000 | Epstein | | |
| 7,654,594 B2 * | 2/2010 | Bisso, IV | .................. | B66C 1/66 294/82.1 |
| 8,381,363 B2 | 2/2013 | Boeckman et al. | | |
| 8,661,945 B1 * | 3/2014 | ElDessouky | .......... | B25B 13/481 81/58.2 |
| 9,903,440 B2 * | 2/2018 | Ohman, III | ............. | F16B 45/04 |
| 2005/0276658 A1 | 12/2005 | Silva | | |
| 2013/0074469 A1 | 3/2013 | Robins | | |

* cited by examiner

Primary Examiner — Robert Sandy
Assistant Examiner — Rowland Do
(74) Attorney, Agent, or Firm — Head, Johnson, Kachigian & Wilkinson, PC

(57) ABSTRACT

A shackle pin split nut assembly for a shackle having a pair of aligned openings for receipt of a shackle bolt. The assembly includes a two-piece clamp having a first ring segment and a second ring segment wherein the ring segments rotate about a pivot pin between a closed and locked position and an open position. A first button is received in a recess in the first ring segment with a spring urging the first button outward. A first tab projects from the first button which travels in a slot in the second ring segment. A second button is received in a recess in the second ring segment with a spring urging the second button outward. A second tab projects from the second button which travels in a slot in the first ring segment wherein the springs urge the first tab and the second tab toward the closed and locked position.

7 Claims, 12 Drawing Sheets

SHACKLE PIN SPLIT NUT ASSEMBLY

CROSS-REFERENCE TO RELATED APPLICATIONS

This application claims priority to and the benefit of U.S. Provisional Patent Application Ser. No. 62/234,437, filed Sep. 29, 2015, which is herein incorporated in its entirety by reference.

BACKGROUND OF THE INVENTION

1. Field of the Invention

The present invention relates to a shackle pin split nut assembly for securing a shackle bolt to a shackle. In particular, the present invention is directed to an apparatus and method for securing a shackle bolt to a shackle utilizing a hinged split nut providing both easy installation and easy removal of the shackle bolt without any tools.

2. Related Art

A shackle is a well-known device used to join slings, cables or ropes together or used to connect a cable or rope to a load. Among the many applications for shackles are tie down, towing, suspension or lifting applications.

In the past, securing mechanisms included a screw-in type wherein the shackle bolt included a threaded end received in the threaded opening of a shackle, or a bolt type anchor along with a threaded nut and a cotter pin.

Also in the past, various types of securing mechanisms for shackles have been proposed. Applicant's securing mechanism (U.S. Pat. No. 8,381,363) includes a hinged split clamp with a retainer pin. Other prior art examples include Epstein (U.S. Pat. No. 6,023,927), Bruce (U.S. Pat. No. 4,221,252) and Peterson (U.S. Pat. No. 5,597,260).

Notwithstanding the foregoing, it would be desirable to provide a securing mechanism for a shackle bolt for a shackle which is both installable and removable without use of any tools.

It would also be desirable to provide a securing mechanism for a shackle bolt for a shackle which eliminates any need for a separate threaded nut and cotter pin.

It would also be desirable to provide a securing mechanism for a shackle bolt for a shackle which remains in the closed and locked position unless manually moved to an open position.

SUMMARY OF THE INVENTION

The present invention is directed to a shackle pin split nut assembly for a shackle having a pair of aligned openings for receipt of a shackle bolt. The shackle bolt includes a head at one end and a circumferential recess or groove near an opposed end.

In one preferred embodiment, the split nut assembly includes a two-piece clamp having a first ring segment and a second ring segment. The first ring segment and the second ring segment pivot with respect to each other about a pivot pin which acts as an axis for rotation of the segments. Accordingly, the segments may move between a closed and locked position and an open position.

A first button has a shaft received in a recess in the first ring segment. A compression spring urges the first button outward. A first tab projects radially outward from the shaft of the first button. The first tab travels in a slot in the second ring segment.

A second button has a shaft received in a recess in the second ring segment. A compression spring urges the second button outward. A second tab projects radially outward from the shaft of the second button. The second tab travels in a slot in the first ring segment.

Each slot includes an arcuate portion which is a neutral position permitting movement of the segment and a linear portion retaining the segment in a locked position. The compression springs urge the tabs toward a locked position.

By depressing both the first button and the second button at the same time, the first tab and the second tab are moved to a neutral position so that the first ring segment and the second ring segment can be manually rotated with respect to each other in order to move the assembly to an open position.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
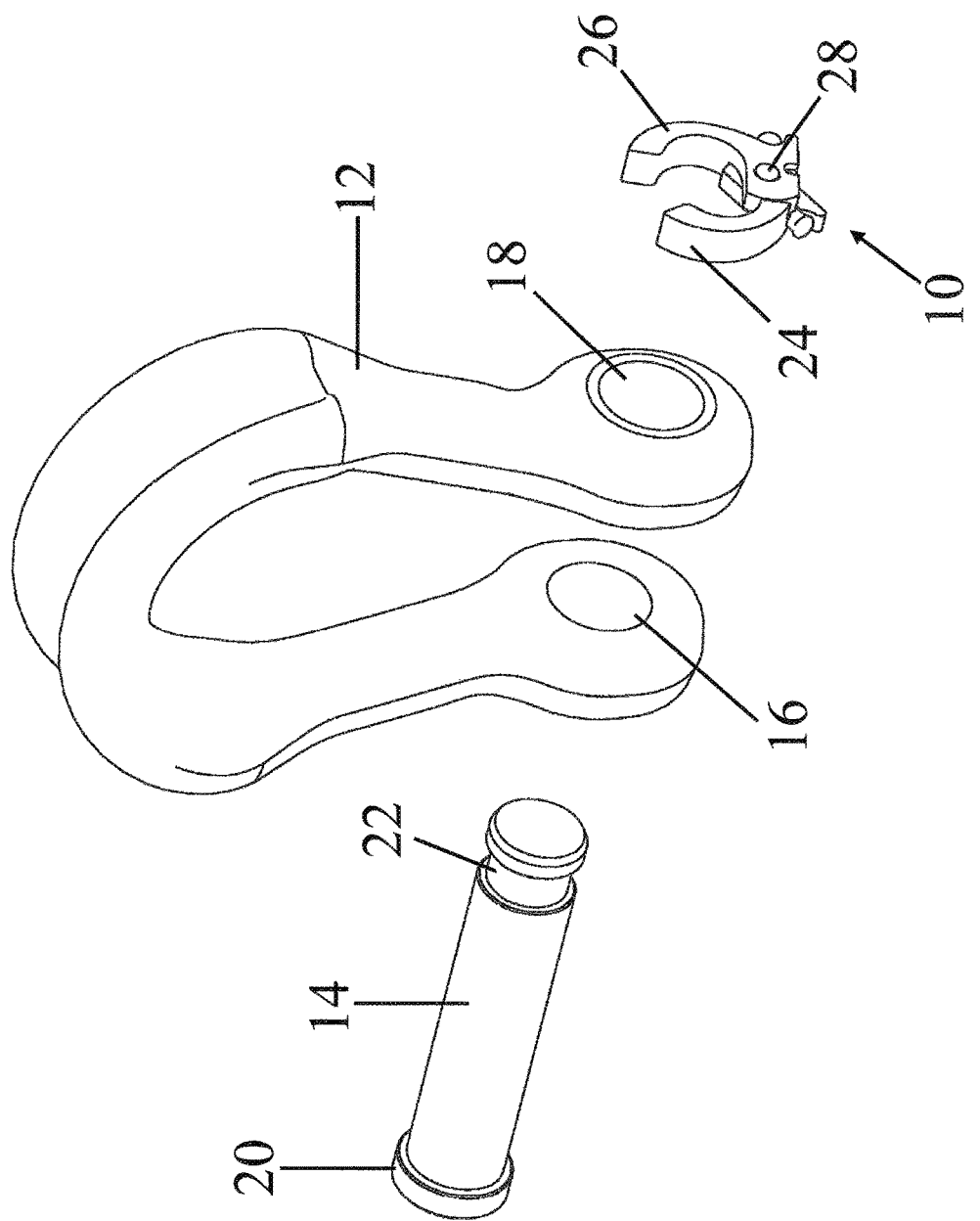
FIG. 1 illustrates a perspective view of a first preferred embodiment of a split nut assembly constructed in accordance with the present invention shown exploded from a shackle and a shackle pin or bolt.

Referring to the drawings in detail, FIGS. 1, 2, 3, 4, 5 and 6 illustrate a first preferred embodiment of the present invention. FIG. 1 illustrates a perspective view of a split nut assembly 10 exploded from a shackle 12 and from a shackle pin or bolt 14. The shackle 12 includes a pair of aligned openings 16 and 18 for receipt of the shackle bolt 14. The shackle bolt 14 includes a head 20 at one end and a circumferential recess or groove 22 near an opposed end.

The split nut assembly 10 includes a two-piece clamp having a first ring segment 24 and a second ring segment 26.

Figure 3:
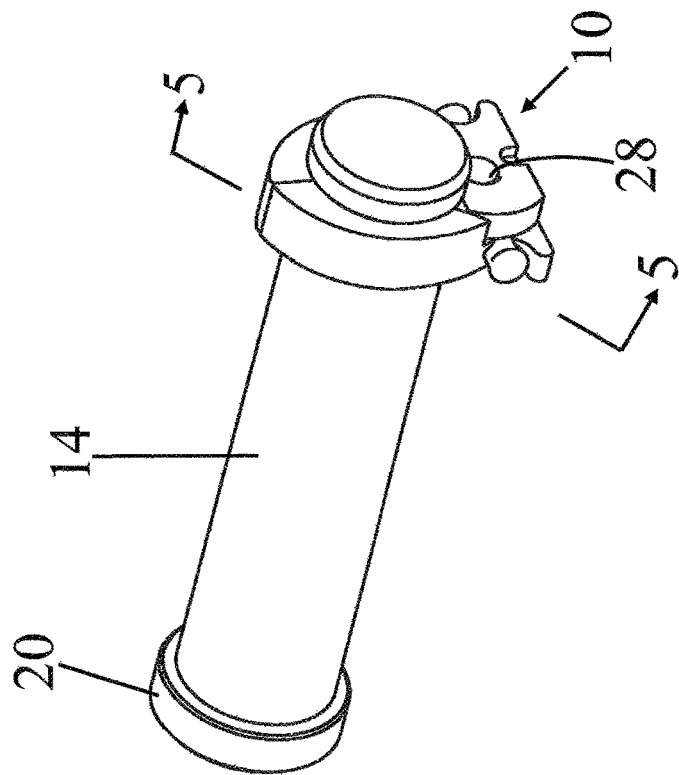
FIG. 3 illustrates the split nut assembly shown in FIG. 1 in a closed and locked position around the shackle bolt.
Figure 2:
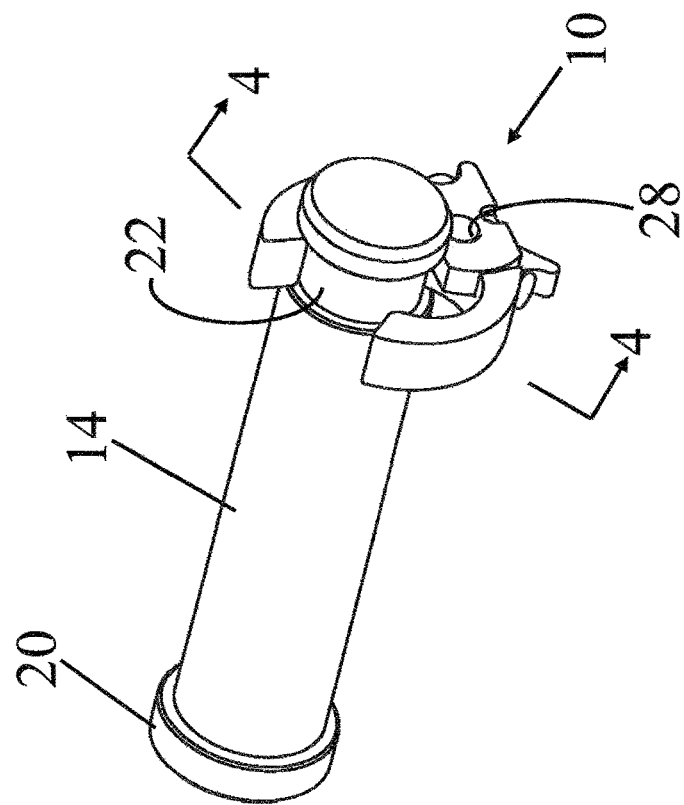
FIG. 2 illustrates the split nut assembly shown in FIG. 1 in an open position surrounding the shackle bolt.

The first ring segment 24 and the second ring segment 26 pivot with respect to each other about a pivot pin 28 which acts as an axis for rotation of the segments. The pivot pin 28 is substantially parallel to the shackle bolt 14. The segments 24 and 26 move between a closed and locked position and an open position. FIG. 2 illustrates the split nut assembly 10 in an open position surrounding the shackle bolt 14, apart from the shackle 12. FIG. 3 illustrates the split nut assembly 10 in a closed and locked position around the shackle bolt 14, apart from the shackle 12. The pivot pin 28 may be riveted or otherwise secured to the split nut assembly 10.

Figure 5:
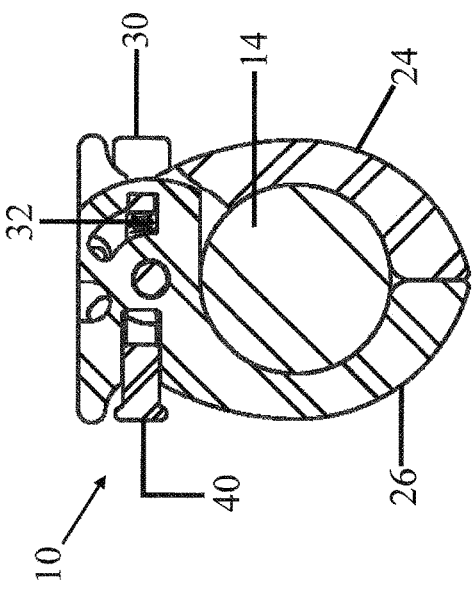
FIG. 5 illustrates a sectional view taken along section line 5-5 of FIG. 4.
Figure 4:
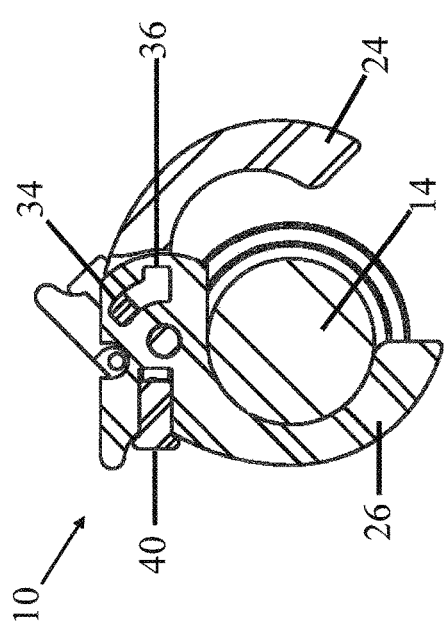
FIG. 4 illustrates a sectional view taken along section line 4-4 of FIG. 2.
Figure 6:
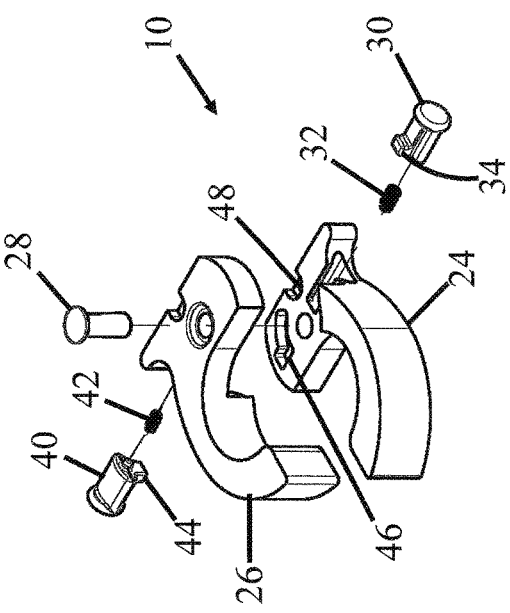
FIG. 6 illustrates an exploded view of the split nut assembly shown in FIG. 1 apart from the shackle bolt and from the shackle.

FIG. 4 illustrates a sectional view taken along section line 4-4 of FIG. 2 while FIG. 5 illustrates a sectional view taken along section 5-5 of FIG. 3. FIG. 6 illustrates an exploded view of the split nut assembly 10 apart from the shackle bolt 14 and the shackle 12.

A first button 30 has a shaft received in a recess in the first ring segment 24. A compression spring 32 urges the first button 30 outward.

A first tab 34 (visible in FIGS. 4 and 6) projects radially outward from the shaft of the first button 30. The first tab 34 travels in a slot 36 in the second ring segment 26.

A second button 40 has a shaft received in a recess in the second ring segment 26. A compression spring 42 urges the second button 40 outward. A second tab 44 projects radially outward from the shaft of the second button 40. The second tab 44 travels in a slot 46 in the first ring segment 24. Each slot 36 and 46 includes an arcuate portion which is a neutral position permitting movement of the segment and also includes a linear portion retaining the segment in a locked position. The compression springs 32 and 42 urge the first tab 34 and the second tab 44, respectively, toward a locked position.

Starting from a closed and locked position, the assembly 10 may be unlocked and moved to an open position for removal of the split nut assembly 10. By depressing both the first button 30 and the second button 40 at the same time, the first tab 34 and the second tab 44 are moved to a neutral position so that the first ring segment 24 and the second ring segment 26 can be manually rotated with respect to each other and be moved to an open position. Once the split nut assembly 10 is in the open position, the assembly 10 may be withdrawn and removed from the shackle bolt 14.

In order to install the split nut assembly 10 on the shackle bolt 14, the opposite procedure is performed.

Each of the segments 24 and 26 has an inner circular edge. As seen in FIGS. 4 and 5, an inner radius of the two-piece clamp formed by the first ring segment 24 and the second ring segment 26 is slightly larger than the radius of the circumferential groove 22 in the shackle bolt 14.

As seen in FIGS. 2 and 3, the width of the two-piece clamp is slightly less than the width of the circumferential groove 22, so that the split nut assembly 10 resides in the groove when in the closed and locked position. Once the split nut assembly 10 surrounds the bolt in the groove, the bolt 14 cannot be removed the shackle 12.

An optional lanyard (not shown) may extend between the split nut assembly 10 and the shackle 12. A tether hole 48 through the assembly 10 may be used to retain the lanyard.

Figure 7:
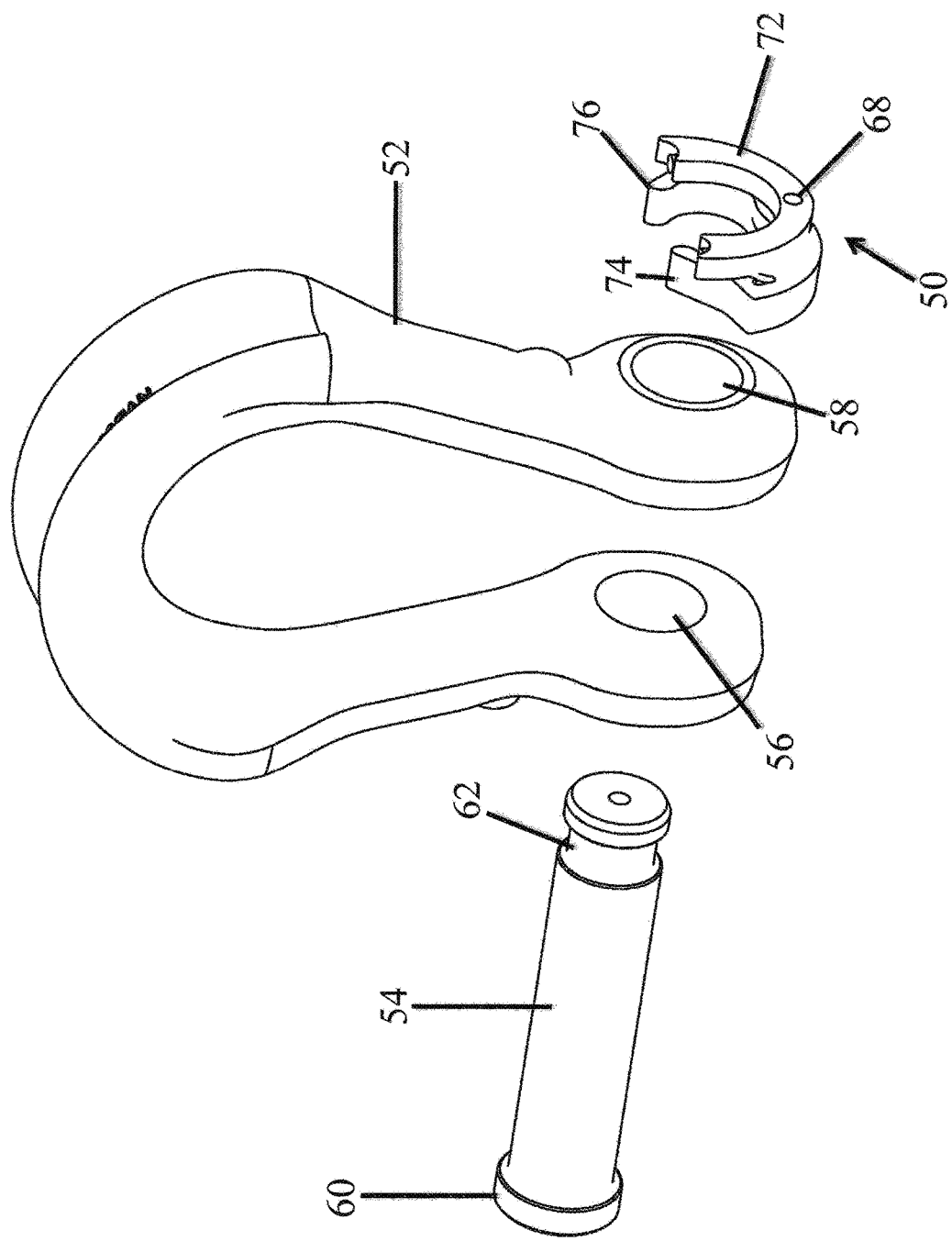
FIG. 7 illustrates a perspective view of a second preferred embodiment of a split nut assembly shown exploded from a shackle and a shackle pin or bolt.

FIGS. 7, 8, 9, 10, 11 and 12 illustrate a perspective view of a second embodiment of the present invention. FIG. 7 illustrates a split nut assembly 50 shown exploded from a shackle 52 having a pair of aligned openings 56 and 58 for receipt of a shackle bolt 54. The shackle bolt 54 has a shackle head 60 at one end and a circumferential recess or groove 62 near an opposed end.

The split nut assembly 50 includes a saddle body 72 having a pivot pin opening 66 for receipt of a pivot pin 68.

Figure 9:
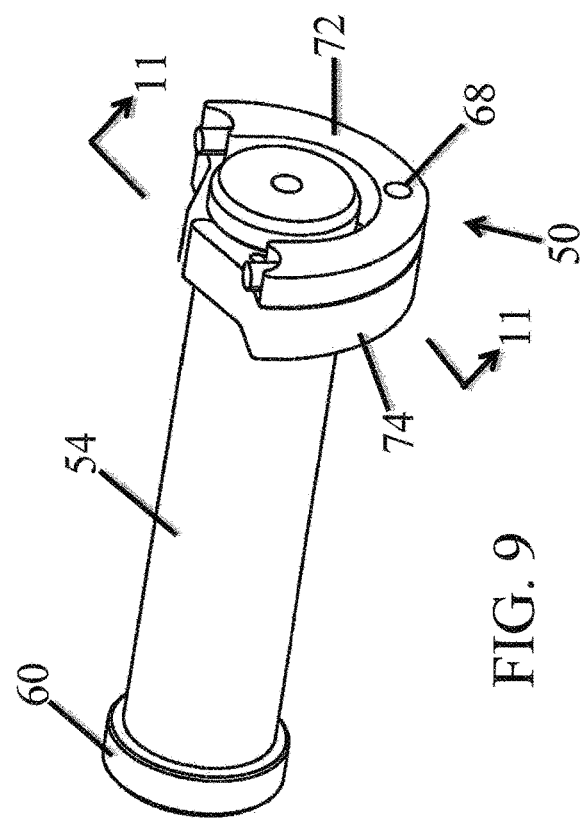
FIG. 9 illustrates the split nut assembly shown in FIG. 7 in a closed and locked position around the shackle bolt.
Figure 8:
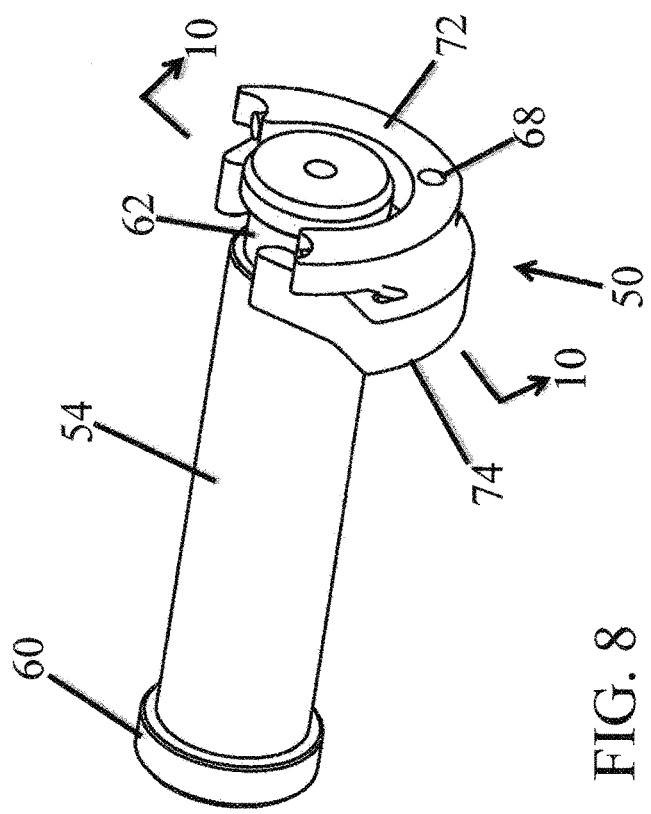
FIG. 8 illustrates the split nut assembly shown in FIG. 7 in an open position surrounding the shackle bolt.

FIG. 8 illustrates the split nut assembly 50 in an open position surrounding the shackle bolt 54. FIG. 9 illustrates the split nut assembly 50 in a closed and locked position around the shackle bolt 54. The pivot pin 68 may be riveted or otherwise secured to the split nut assembly 50.

Figure 10:
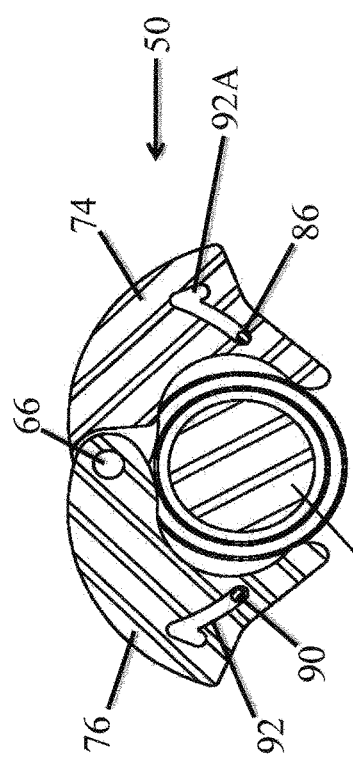
FIG. 10 illustrates a sectional view taken along section line 10-10 of FIG. 8.
Figure 12:
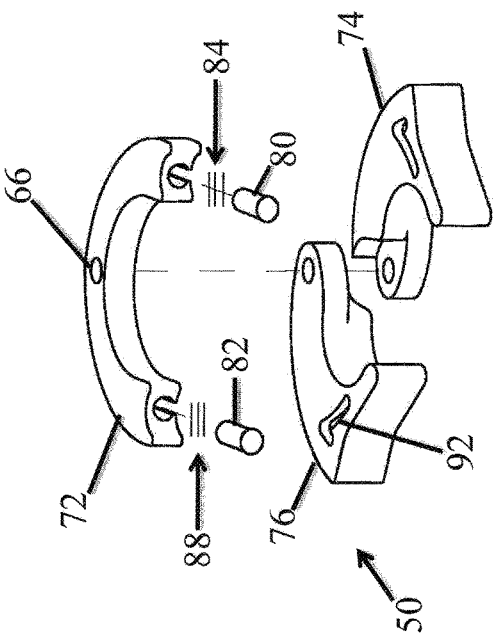
FIG. 12 illustrates an exploded view of the split nut assembly shown in FIG. 7 apart from the shackle bolt and from the shackle.
Figure 11:
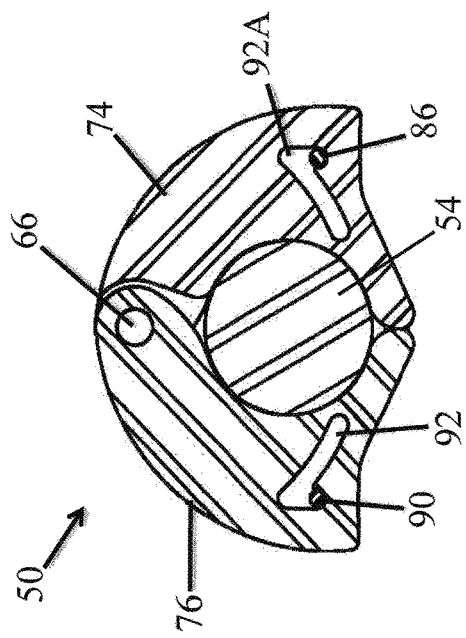
FIG. 11 illustrates a sectional view taken along section line 11-11 of FIG. 9.

FIG. 10 illustrates a sectional view taken along section line 10-10 of FIG. 8 while FIG. 11 illustrates a sectional view taken along section line 11-11 of FIG. 9. FIG. 12 illustrates an exploded view of the split nut assembly 50 apart from the shackle bolt 54 and the shackle 52.

The split nut assembly 50 includes a two-piece clamp having a first ring segment 74 and a second ring segment 76. The first ring segment 74 and the second ring segment 76 pivot with respect to each other about the pivot pin 68 which acts as an axis for rotation of the segments.

A first button 80 has a shaft received in a recess in the saddle body 72. A compression spring 84 urges the first button outward. A first tab 86 (visible in FIGS. 10 and 11) projects radially outward from the shaft of the first button 80. The first tab 86 travels in a slot 92A in the first segment 74.

A second button 82 is received in a recess in the saddle body 72. A compression spring 88 urges the second button 82 outward. A second tab 90 (visible in FIGS. 10 and 11) projects radially from the shaft of the second button 82. The second tab 90 travels in a slot 92 in the second segment 76. Each slot includes an arcuate portion which is a neutral position permitting movement of the segment and a linear portion retaining the segment in a locked position. The compression springs 84 and 88 urge the first tab 86 and the second tab 90, respectively, toward a locked position.

Starting from a closed and locked position, the split nut assembly 50 may be unlocked and moved to an open position for removal of the assembly 50. By depressing both the first button 80 and the second button 82 at the same time, the first tab 86 and the second tab 90 are moved to a neutral position so that the first ring segment 74 and the second ring segment 76 can be manually rotated with respect to each other and move to an open position. Once the assembly 50 is in the open position, the assembly 50 may be withdrawn and removed from the shackle bolt 54.

In order to install the split nut assembly 50 on the shackle bolt 54, the opposite procedure is performed.

As seen in FIGS. 8 and 9, the width of the two-piece clamp is slightly less than the width of the circumferential groove in the shackle bolt 54.

As seen in FIGS. 10 and 11, the inner radius of the two-piece clamp formed by the first ring segment 74 and the second ring segment 76 is slightly larger than the radius of the circumferential groove 62 in the shackle bolt 54.

Each of the segments 74 and 76 has an inner circular edge. An inner radius of the two-piece clamp is slightly larger than the radius of the circumferential groove in the shackle bolt 54.

An optional lanyard (not shown) may extend between the saddle body 72 and the shackle 52.

FIGS. 13, 14, 15 and 16 illustrate a third preferred embodiment of the present invention.

Figure 13:
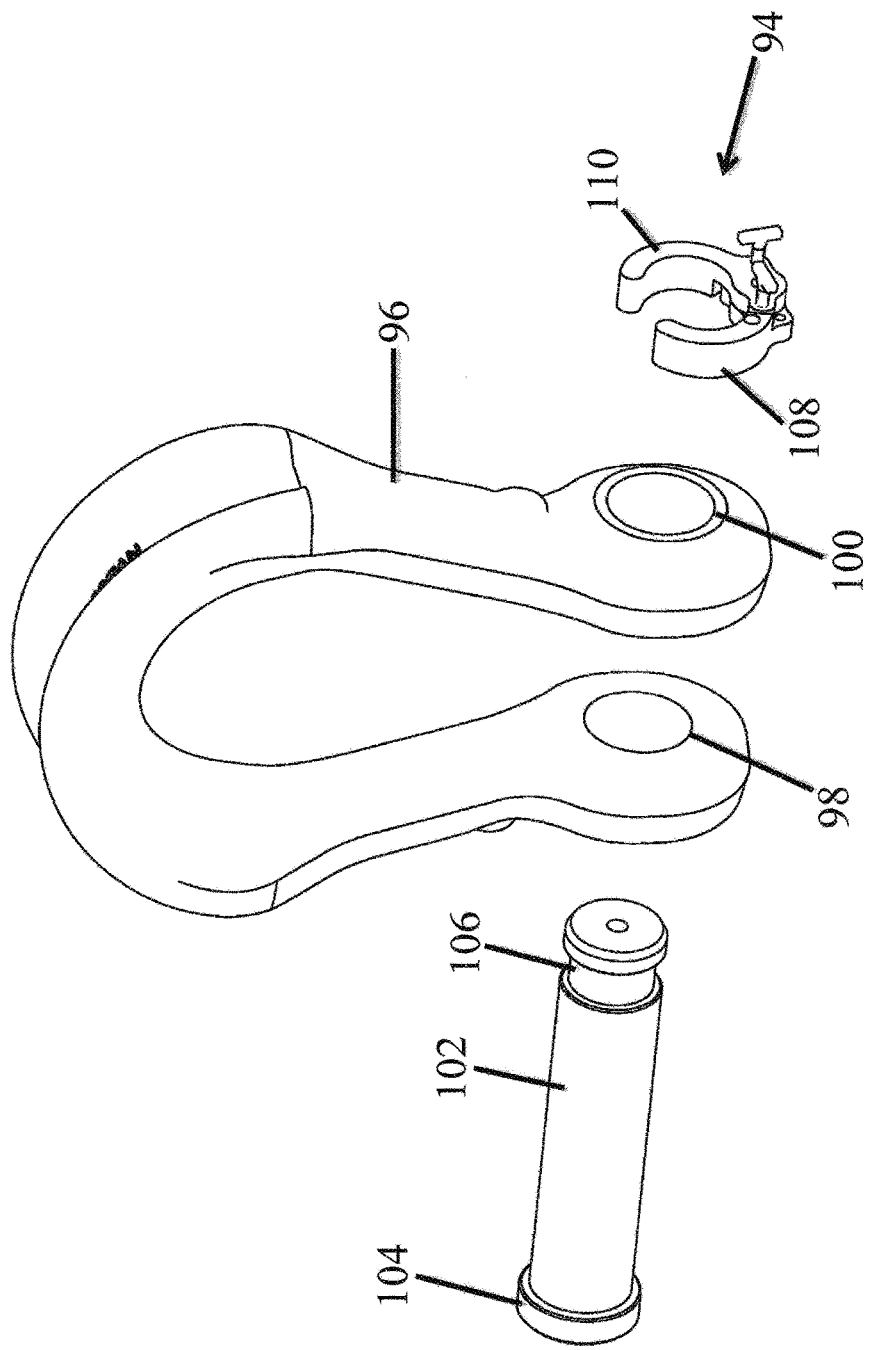
FIG. 13 illustrates a perspective view of a third preferred embodiment of a split nut assembly exploded from a shackle and a shackle bolt.

FIG. 13 illustrates a split nut assembly 94 exploded from a shackle 96 having a pair of aligned openings 98 and 100 for receipt of a shackle bolt 102. The shackle bolt 102 includes a shackle head 104 at one end and a circumferential recess or groove 106 near an opposed end.

The split nut assembly 94 includes a two-piece clamp having a first ring segment 108 and a second ring segment 110. The first ring segment 108 and the second ring segment 110 pivot with respect to each other about a pivot pin 112 which acts as an axis for rotation of the segments. The pivot pin 112 is substantially parallel to the shackle bolt 102.

Figure 15:
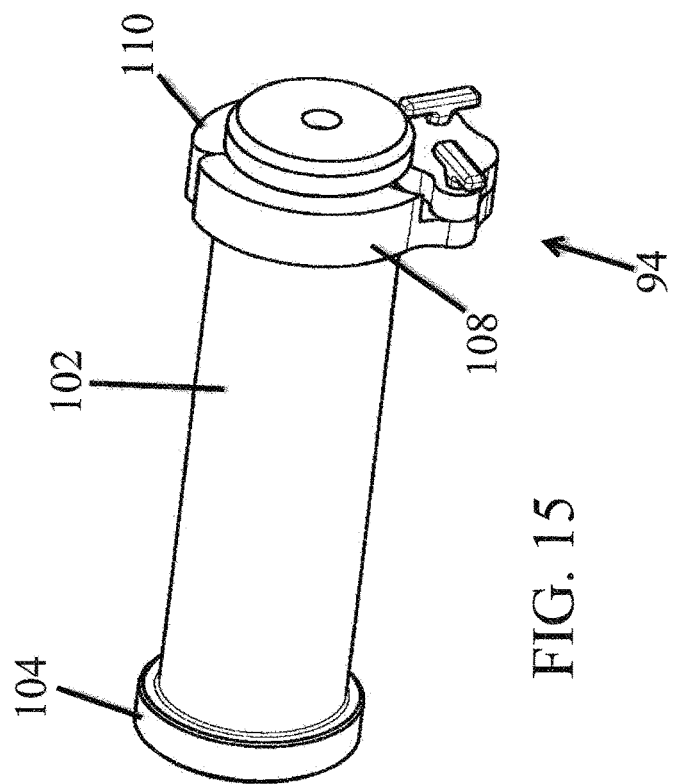
FIG. 15 illustrates the split nut assembly shown in FIG. 13 in a closed and locked position around the shackle bolt.
Figure 14:
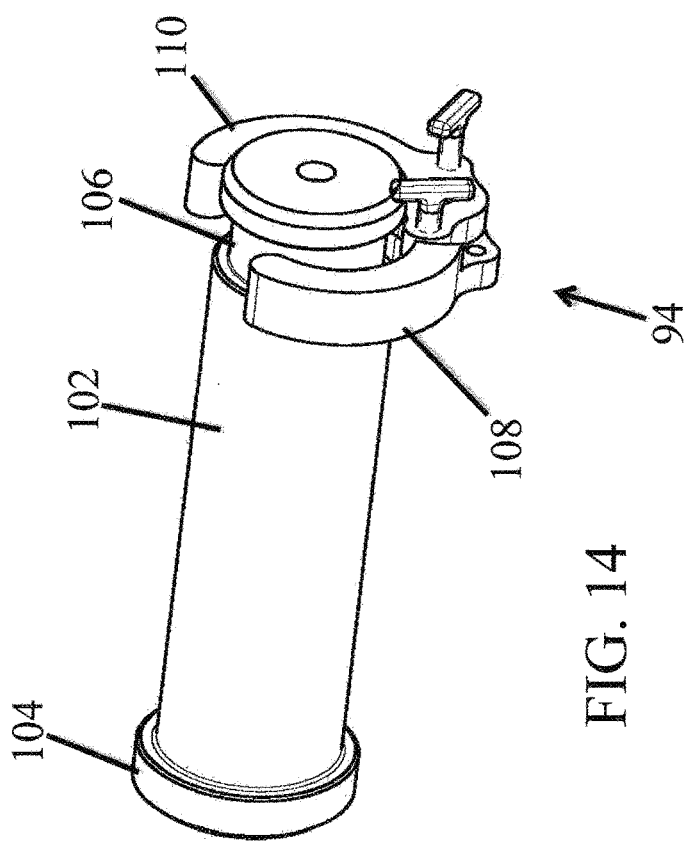
FIG. 14 illustrates the split nut assembly shown in FIG. 13 in an open position surrounding the shackle bolt.
Figure 16:
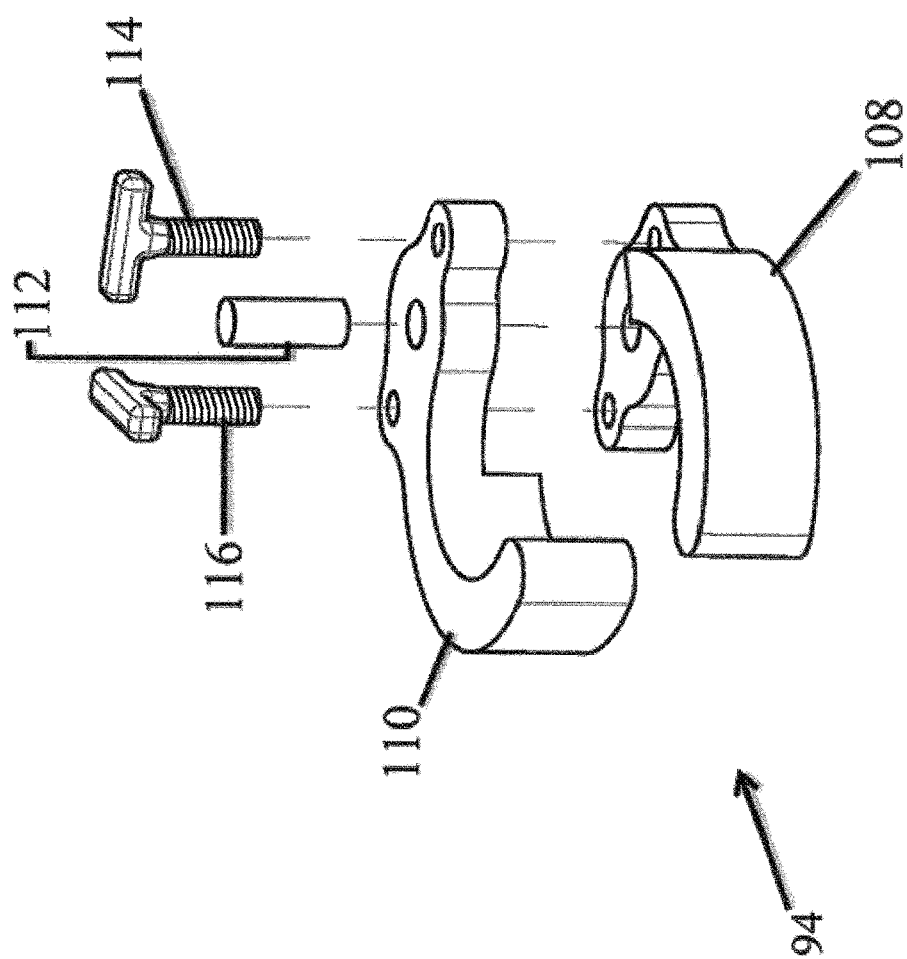
FIG. 16 illustrates an exploded view of the split nut assembly shown in FIG. 13 apart from the shackle and from the shackle bolt.

The segments 108 and 110 move between a closed and locked position and an open position. FIG. 14 illustrates the split nut assembly 94 in an open position surrounding the shackle bolt 102 apart from the shackle. FIG. 15 illustrates the split nut assembly 94 in a closed and locked position around the shackle bolt 102. FIG. 16 illustrates an exploded view of the split nut assembly 94 apart from the shackle bolt 102 and the shackle 96. The pivot pin 112 may be riveted or otherwise secured to the split nut assembly 94.

A first lock pin 114 having a threaded end passes through an opening in the second ring segment 110 and will be received in a threaded opening in the first ring segment 108. A second lock pin 116 having a threaded end passes through an opening in the second ring segment 110 and into a threaded opening in the first ring segment 108. When the two-piece clamp assembly is in the closed position, the first lock pin 114 may be threadably connected to the first ring segment 108. Likewise, the second lock pin 116 may be threadably secured to the first ring segment 108. Accordingly, the two-piece clamp assembly will be locked in the closed position.

Starting from a closed and locked position, the split nut assembly 94 may be unlocked and moved to an open position for removal of the assembly 94. In order to open the split nut assembly 94, the lock pins 114 and 116 are unthreaded and withdrawn, permitting the first ring segment 108 to be rotated with respect to the second ring segment 110 to the open position.

In order to install the split nut assembly 94 on the shackle bolt 102, the opposite procedure is performed.

An optional lanyard (not shown) may extend between the split nut assembly 94 and the shackle 96.

Figure 17:
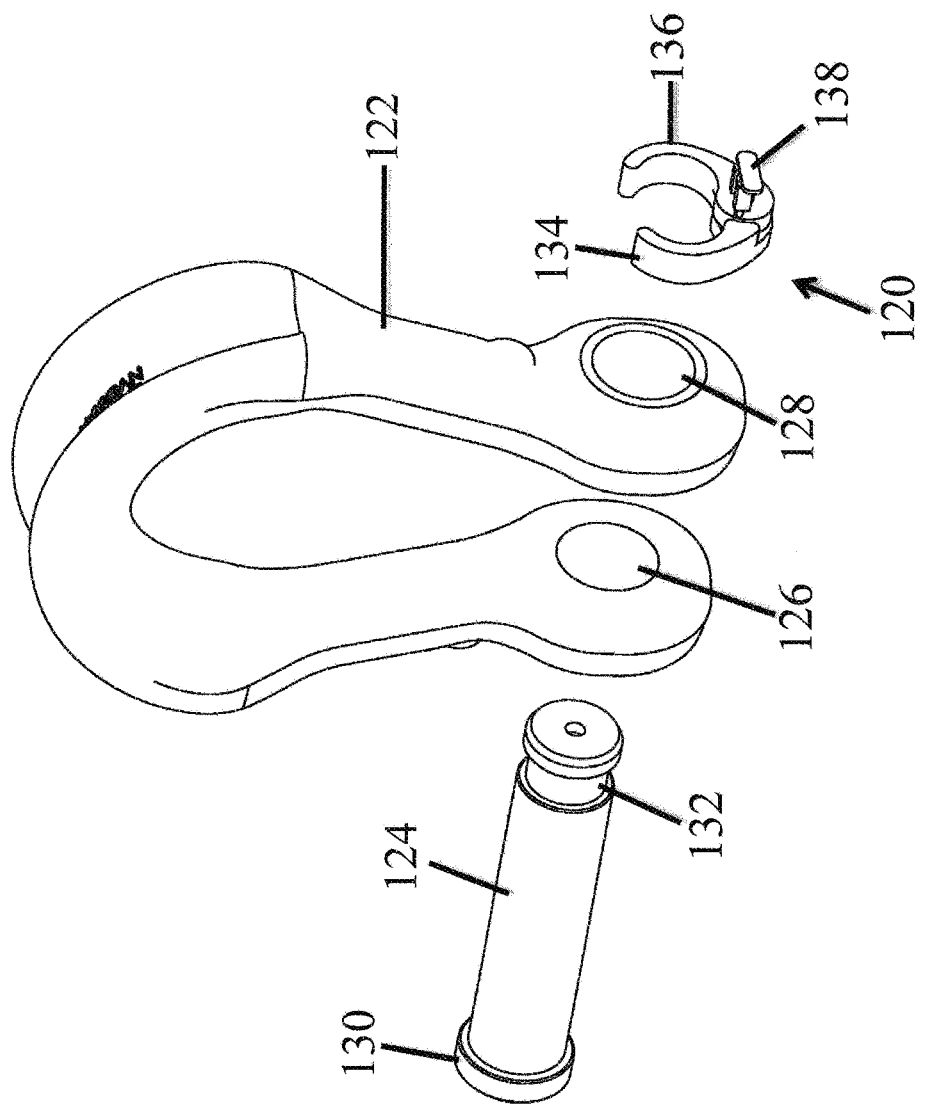
FIG. 17 illustrates a perspective view of a fourth preferred embodiment of a split nut assembly of the present invention exploded from a shackle and a shackle bolt.

FIGS. 17, 18, 19, 20, 21 and 22 illustrate a fourth embodiment of the present invention. FIG. 17 illustrates a split nut assembly 120 exploded from a shackle 122 and a shackle pin or bolt 124. The shackle 122 includes a pair of aligned openings 126 and 128 for receipt of the shackle bolt 124. The shackle bolt 124 includes a head 130 at one end and a circumferential recess or groove 132 near an opposed end.

The split nut assembly 120 includes a two-piece clamp having a first ring segment 134 and a second ring segment 136.

The first ring segment 134 and the second ring segment 136 pivot with respect to each other about a pivot pin 138 which acts as an axis for rotation of the segments. The segments move between a closed and locked position and an open position.

Figure 19:
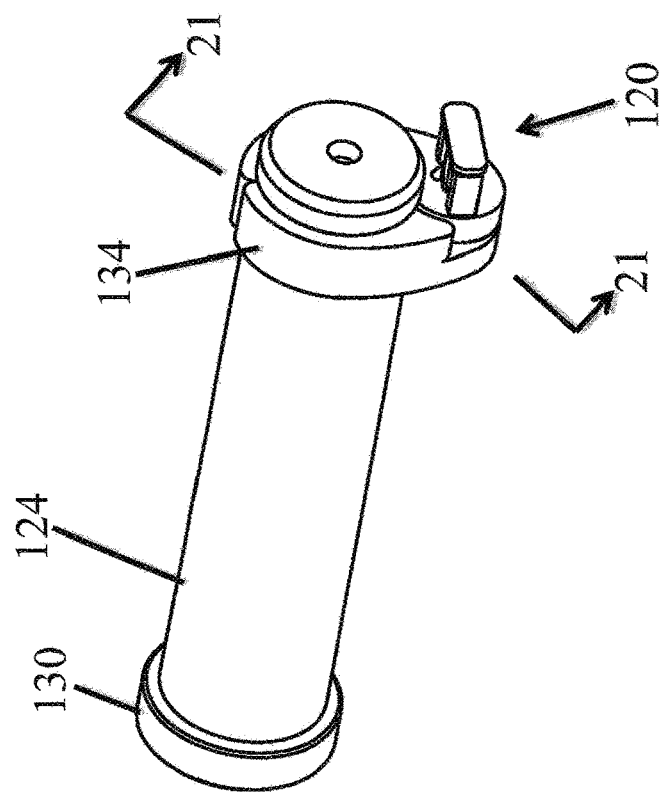
FIG. 19 illustrates the split nut assembly shown in FIG. 17 in a closed and locked position around the shackle bolt.
Figure 18:
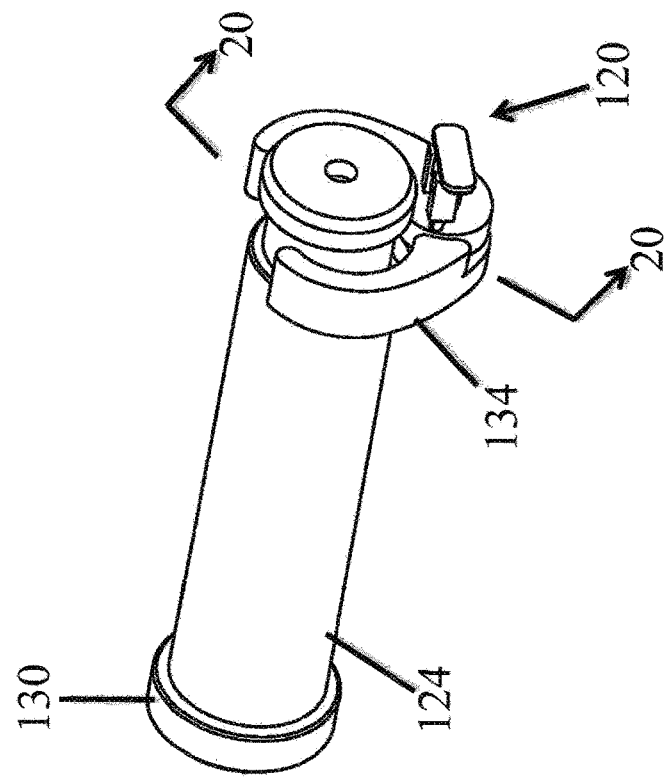
FIG. 18 illustrates the split nut assembly shown in FIG. 17 in an open position surrounding the shackle bolt.

FIG. 18 illustrates the split nut assembly 120 in an open position surrounding the shackle bolt 124 apart from the shackle. FIG. 19 illustrates the split nut assembly 120 in a closed and locked position around the shackle bolt 124. The pivot pin 138 extends through and also extends and projects outward from the segments 134 and 136 in an axial direction.

Figure 20:
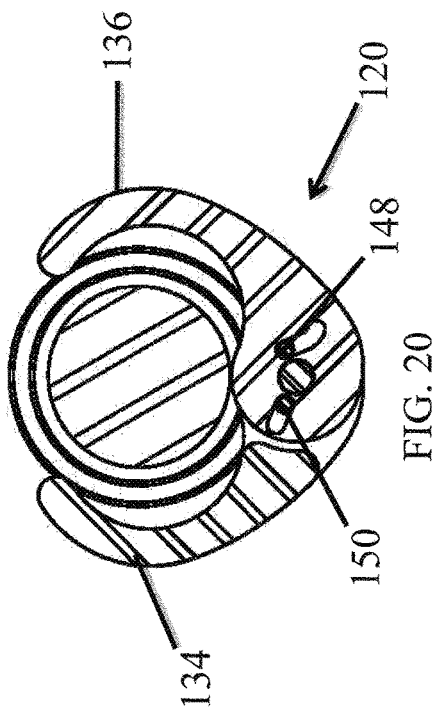
FIG. 20 illustrates a sectional view taken along section line 20-20 of FIG. 18.
Figure 22:
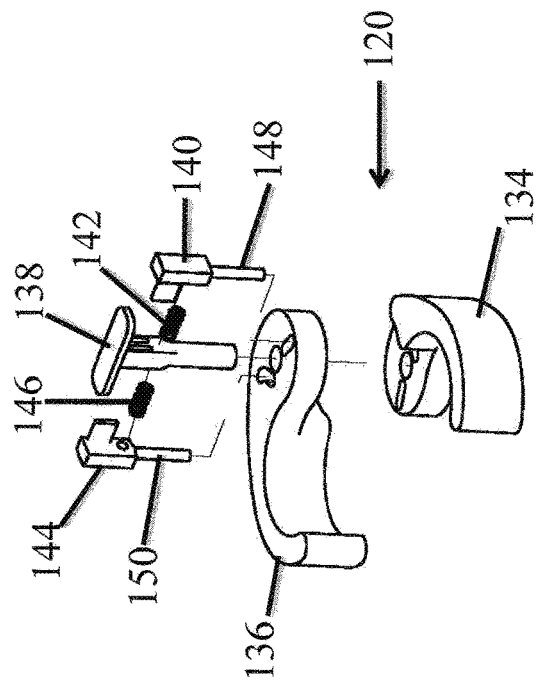
FIG. 22 illustrates an exploded view of the split nut assembly shown in FIG. 17 apart from the shackle bolt and the shackle.
Figure 21:
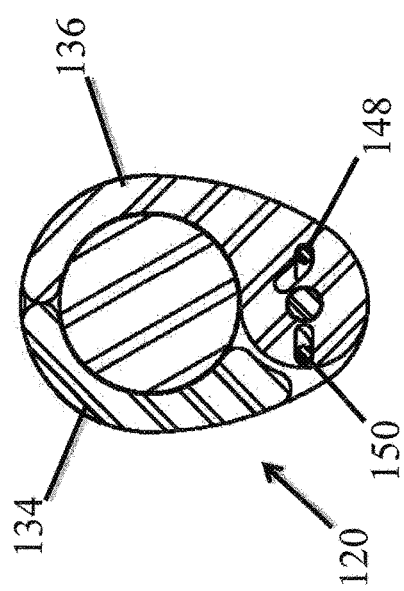
FIG. 21 illustrates a sectional view taken along section line 21-21 of FIG. 19.

FIG. 20 illustrates a sectional view taken along section line 20-20 of FIG. 18 while FIG. 21 illustrates a sectional view taken along section line 21-21 of FIG. 19. FIG. 22 illustrates an exploded view of the split nut assembly 120 apart from the shackle bolt and the shackle.

A first button 140 is engaged with the pivot pin 138 and is urged away from the pivot pin by a compression spring 142. A second button 144 is engaged with the pivot pin 138 and is urged away from the pivot pin by a compression spring 146.

A first tab 148 (visible in FIGS. 20, 21 and 22) projects axially outward from the first button 140. The first tab 148 travels in a slot in the second ring segment 136.

A second tab 150 (visible in FIGS. 20, 21 and 22) projects axially outward from the second button 144. The second tab 150 travels in a slot in the second ring segment 136.

Starting from a closed and locked position, the split nut assembly 120 may be unlocked and moved to an open position for removal of the assembly 120. By depressing both the first button 140 and the second button 144 at the same time, the first tab 148 and the second tab 150 are moved to neutral positions so that the first ring segment 134 and the second ring segment 136 can be rotated with respect to each other and be moved to an open position.

An optional lanyard (not shown) may extend between the split nut assembly 120 and the shackle 122.

The securement system of the present invention has been found to substantially reduce the installation and removal time required.

Whereas, the present invention has been described in relation to the drawings attached hereto, it should be understood that other and further modifications, apart from those shown or suggested herein, may be made within the spirit and scope of this invention.

What is claimed is:

1. A shackle pin split nut assembly for a shackle having a pair of aligned openings for receipt of a shackle bolt, which assembly comprises:

a two-piece clamp having a first ring segment and a second ring segment which rotate about a pivot pin between a closed and locked position and an open position;

a first button received in a recess in said first ring segment with a spring urging said first button outward;

a first tab projecting from said first button which travels in a slot in said second ring segment;

a second button received in a recess in said second ring segment with a spring urging said second button outward; and a second tab projecting from said second button which travels in a slot in said first ring segment, wherein said springs urge said first tab and said second tab toward said closed and locked position.

2. A shackle pin split nut assembly as set forth in claim 1 wherein said shackle bolt has a head at one end and a circumferential groove near an opposed end and wherein an inner radius of said two-piece clamp is slightly larger than a radius of said circumferential groove in said shackle bolt.

3. A shackle pin split nut assembly as set forth in claim 2 wherein a width of said two-piece clamp is slightly less than a width of said circumferential groove in said shackle bolt.

4. A shackle pin split nut assembly as set forth in claim 1 wherein said first button spring is a compression spring engaging an end of said first button.

5. A shackle pin split nut assembly as set forth in claim 1 wherein said second spring is a compression spring engaging an end of said second button.

6. A shackle pin split nut assembly as set forth in claim 1 wherein said outside diameter of said two-piece clamp is larger than the diameter of each of said pair of aligned openings in said shackle.

7. A shackle pin split nut assembly as set forth in claim 1 including a lanyard extending between said two-piece clamp and said shackle.

* * * * *